(12) United States Patent  
Nawa

(10) Patent No.: US 6,710,970 B2
(45) Date of Patent: Mar. 23, 2004

(54) EJECTION MECHANISM FOR USE IN A TAPE DRIVE THAT HAS AN ADJUSTABLE EJECTION AMOUNT

(75) Inventor: Ikuichiro Nawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 319 days.

(21) Appl. No.: 10/082,938

(22) Filed: Oct. 19, 2001

(65) Prior Publication Data

US 2002/0093756 A1 Jul. 18, 2002

(30) Foreign Application Priority Data

Oct. 20, 2000 (JP) ........................................ 2000-320699

(51) Int. Cl.[7] .............................................. G11B 5/008
(52) U.S. Cl. ...................................... 360/93; 360/99.06
(58) Field of Search ............ 360/93–96.6, 99.02–99.07; 242/324–360

(56) References Cited

U.S. PATENT DOCUMENTS

| 4,107,747 A | * | 8/1978 | Kumaki ........................ 360/93 |
| 5,414,585 A | | 5/1995 | Saliba |
| 5,793,574 A | | 8/1998 | Cranson et al. |
| 5,857,634 A | | 1/1999 | Hertrich |
| 5,862,014 A | | 1/1999 | Nute |
| 6,241,171 B1 | | 6/2001 | Gaboury |

FOREIGN PATENT DOCUMENTS

| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

Primary Examiner—A. J. Heinz
(74) Attorney, Agent, or Firm—Frishauf, Holtz, Goodman & Chick, P.C.

(57) ABSTRACT

In an ejection mechanism (30) mounted on one side surface (11c) of a drive (10) in order to eject a cartridge (20) from the drive, a damping member (32, 33) for braking movement of an ejection lever (31) by engaging with the eject lever has a stopper (331c) for stopping the movement of the ejection lever. A mounting position of the damping member to the one side surface is adjusted by a mounting adjusting arrangement (331a, 331b, 34). When the cartridge is inserted in the drive, the ejection lever (31) having an engaging portion (311) for engaging with a front end surface (22) of the cartridge is urged in an ejection direction (B) by an ejection spring (37).

6 Claims, 17 Drawing Sheets

EJECTION MECHANISM FOR USE IN A TAPE DRIVE THAT HAS AN ADJUSTABLE EJECTION AMOUNT

BACKGROUND OF THE INVENTION

This invention relates to a tape drive such as a linear tape storage system represented by DLT (digital liner tape) or LTO (linear tape open) and, in particular, to an ejection mechanism for ejecting a tap cassette (tape cartridge) from the tape drive.

Linear tape storage systems of the type described are developed as "back-up" systems for hard disks of computer systems and various types of the linear tape storage systems have been proposed in prior art. For example, a digital linear tape drive serving as the DLT is disclosed in U.S. Pat. No. 5,862,014 to Nute, entitled: "Multi-Channel Magnetic Tape Head Module Including Flex Circuit" or the like.

The digital linear tape drive (which may be merely called "driving apparatus", "tape drive", or "drive") is for receiving a tape cartridge (which may be merely called "cartridge") having a single reel (a supply reel) and contains a take-up reel therein. When the tape cartridge is installed in the driving apparatus, a magnetic tape is pulled out of the tape cartridge and then is wound by the take-up reel through a head guide assembly (HGA). The head guide assembly is for guiding the magnetic tape (which may be merely called "tape") pulled out of the tape cartridge in a magnetic head. The magnetic head exchanges information between the tape and the magnetic head. The head guide assembly generally comprises a boomerang-shaped aluminum plate and six large guide rollers each using a bearing.

In addition, the head guide assembly is also called a tape guide assembly which is disclosed, for example, in U.S. Pat. No. 5,414,585 to Saliba, entitled: "Rotating Tape Edge Guide." In addition, an example of the guide roller is disclosed in Japanese Unexamined Patent Publication Tokkai No. 20001-100025 or JP-A 2000-100025.

The tape drive is generally comprised of a rectangular housing that has a common base as described, for example, in U.S. Pat. No. 5,793,574, entitled: "Tape Head Actuator Assembly Having A Shock Suppression Sleeve" to Cranson et al. The base has two spindle motors (reel motors). The first spindle motor has a spool (or a take-up reel) permanently mounted on the base and the spool is dimensioned to accept a relatively high speed streaming magnetic tape. The second spindle motor (reel motor) is adapted to accept a removable tape cartridge. The removable tape cartridge is manually or automatically inserted into the drive via a slot formed on the drive's housing. Upon insertion of the tape cartridge into the slot, the cartridge engages the second spindle motor (reel motor). Prior to rotation of the first and the second spindle motors, the tape cartridge is connected to the permanently mounted spool (the take-up reel) by means of a mechanical buckling mechanism. A number of rollers (guide rollers) positioned intermediate the tape cartridge and the permanent spool guide the magnetic tape as it traverses at relatively high speeds back and forth between the tape cartridge and the permanently mounted spool.

In the digital linear tape drive having such a structure, an apparatus for pulling the tape from the supply reel to the take-up reel is required. Such as a pulling apparatus is disclosed, for example, in International Publication Number WO 86/07471. According to WO 86/07471, take up leader means (a first tape leader) is coupled to the take-up reel while supply tape leader means (a second tape leader) is connected to the tape on the supply reel. The first tape leader has one end formed into a mushroom like tab. The second tape leader has a locking aperture. The tab is engaged into the locking aperture.

Furthermore, a mechanism for joining the first tape leader with the second tape leader is required. Such a joining mechanism is disclosed, for example, in International Publication number WO 86/07295.

In addition, Japanese Unexamined Patent Publication Tokkai No. 2000-100116 or JP-A 2000-100116 discloses a structure of leader tape engaging part which can engage an end part of a leader tape (the second tape leader) to a tape end hooking part in a tape cartridge without requiring a tab projected in the side of the leader tape.

U.S. Pat. No. 5,857,634, entitled: "Take-up Reel Lock" to Hertrich discloses a locking system for preventing a take-up reel of a tape drive from rotating when a tape cartridge is not inserted to the drive.

In addition, the tape drive further comprises a tape head actuator assembly which is located between a take-up spool and a tape cartridge on a tape path defined by a plurality of rollers. During operation, a magnetic tape flows forward and backward between the take-up spool and the tape cartridge and is closely adjacent to the tape head actuator assembly while the magnetic tape flows on the defined tape path. An example of such as a tape head actuator assembly is disclosed in the above-mentioned U.S. Pat. No. 5,793,574.

On the other hand, an example of the tape cartridge installed in the digital linear tape drive is disclosed in Japanese Unexamined Patent Publication Tokkai No. 2000-149491 or JP-A 2000-149491.

In addition, U.S. Pat. No. 6,241,171, entitled: "Leaderless Tape Drive" to Gaboury discloses a tape drive wherein a tape leader from a tape cartridge is urged through a tape path, into a take-up reel, and secured therein without the use of a bucking mechanism or a take-up leader.

Now, when the tape cartridge is inserted in the tape drive and when information exchange between the magnetic head and the magnetic tape pulled out of the tape cartridge completes, the magnetic tape is rewound in the tape cartridge again. Thereafter, when an operator operates an ejection bottom in order to eject the tape cartridge from the tape drive, the tape cartridge is ejected from the tape drive by an ejection mechanism. In the manner which will later be described in conjunction with FIGS. 1 through 5, a conventional ejection mechanism has a constant ejection amount. The ejection amount means a projection amount measured with reference to a bezel on ejecting.

SUMMARY OF THE INVENTION

It is therefore an object of the present invention to provide an ejection mechanism which is capable of varying and adjusting an ejection amount.

It is another object of the present invention to provide an ejection mechanism of the type described, which dose not hinder other parts.

It is still another object of the present invention to provide an ejection mechanism of the type described, which is capable of optionally adjusting an ejection amount within a range of 15 mm and 30 mm with reference to a front bezel.

Other objects of this invention will become clear as the description proceeds.

On describing the gist of an aspect of this invention, it is possible to be understood that an ejection mechanism is mounted on one side surface of a drive to eject, from the drive, a cartridge inserted in the drive. The ejection mechanism comprises an ejection lever extending in an insertion direction of the cartridge. The ejection lever is slidably mounted on the one side surface in an insertion/extraction direction of the cartridge. The ejection lever has an engaging portion for engaging with a front end surface of the cartridge when the cartridge is inserted in the drive. An urging arrangement urges the ejection lever in an ejection direction of the cartridge. The urging arrangement extends in the insertion/extraction direction. The urging arrangement has an end connected to the one side surface and another end connected to the ejection lever. Mounted on the one side surface and engaged with the ejection lever, a damping member brakes movement of the ejection lever. The damping member has a stopper for stopping the movement of the ejection lever. A mounting position adjusting arrangement adjusts a mounting position of the damping member to the one side surface.

In the above-mentioned ejection mechanism, the damping member preferably may comprise a damper for braking the movement of the ejection lever and a damper holder, mounted on the one side surface, for holding the damper. The damper holder may have a mounting surface mounted and fixed on the one side surface and a damper holding surface which is perpendicularly bent from the mounting surface and which extends horizontally. The damper holding surface holds the damper thereon. In this event, the above-mentioned mounting position adjusting arrangement preferably may comprise a pair of long holes which is formed in the mounting surface and which extends in the insertion/extraction direction with apart from each other. Each of the long holes has a predetermined length. A pair of screws fixes the mounting surface on the one side surface through the pair of long holes by screwing the mounting surface on the one side surface. The predetermined length may be, for example, equal to about 15 mm.

In addition, the above-mentioned urging arrangement desirably may comprise an ejection spring having an end connected to a protrusion portion protruding from the one side surface at a front side of the tape driver and another end connected to a projection portion projecting from the ejection lever at a back side end of the ejection lever.

Furthermore, the ejection lever preferably may comprise a rack which extends between a center thereof and a back side thereof. The damping member may comprise a damper for braking the movement of the ejection lever and a damper holder, mounted on the one side surface, for holding said damper. The damper may comprise a damper body fixed on the damper holder and a pinion, rotatably mounted on the damper body, for engaging with the rack. In this event, the above-mentioned stopper preferably may be formed on the damper holder.

DESCRIPTION OF THE PREFERRED EMBODIMENT

Figure 1:
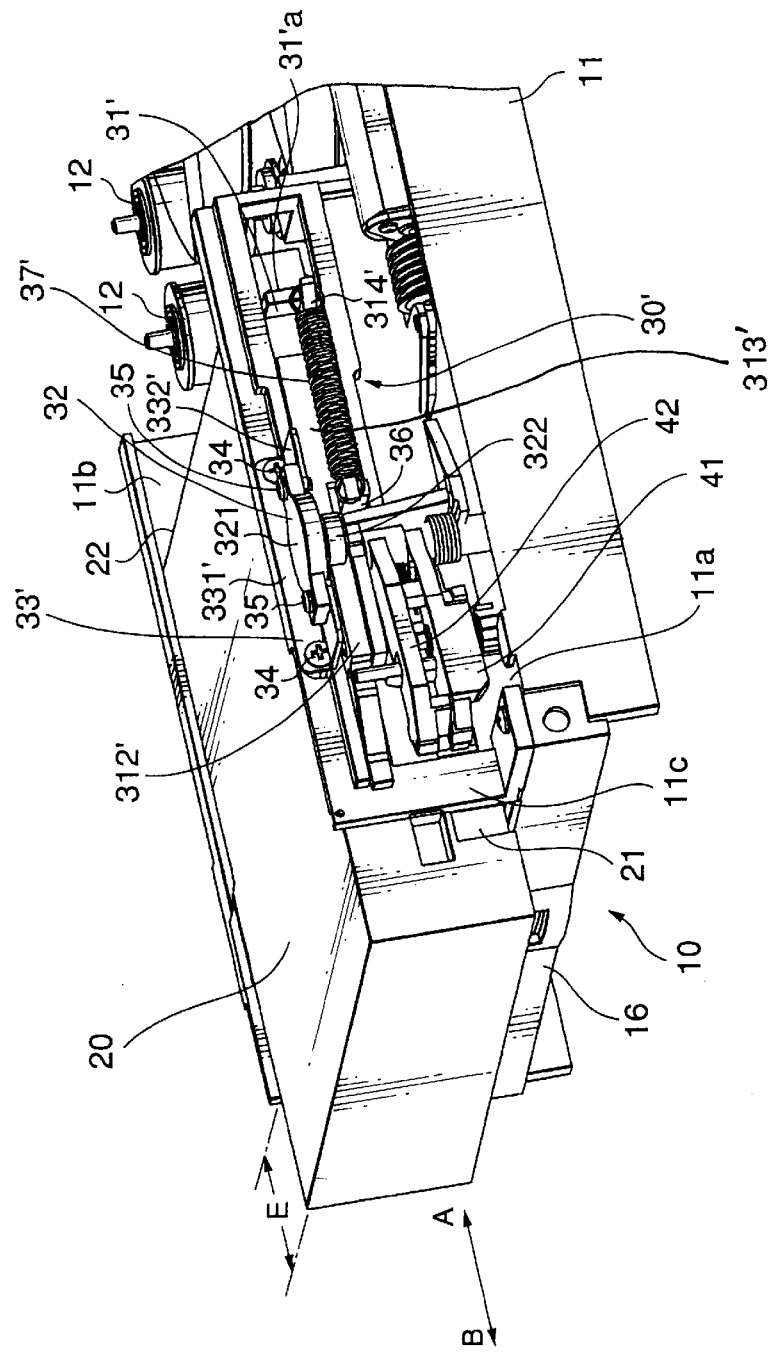
FIG. 1 is a perspective view showing a tape drive including a conventional ejection mechanism together with a tape cartridge inserted therein and shows a state where the tape cartridge is ejected from the tape drive.
Figure 2A:
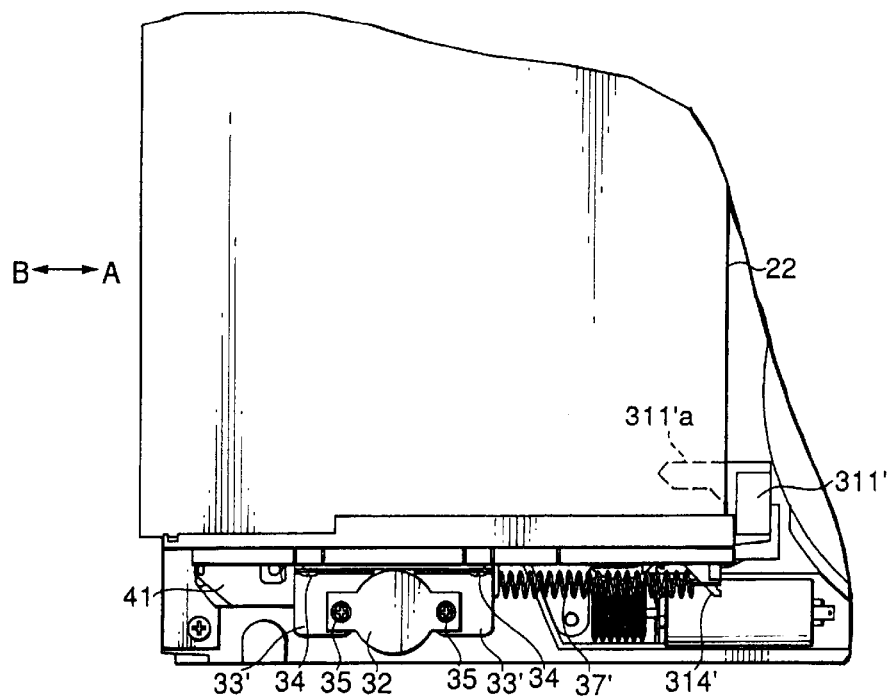
FIGS. 2A and 2B are a plan view and a right-hand side view collectively showing a state where the tape cartridge is inserted in the tape drive illustrated in FIG. 1, respectively.
Figure 2B:
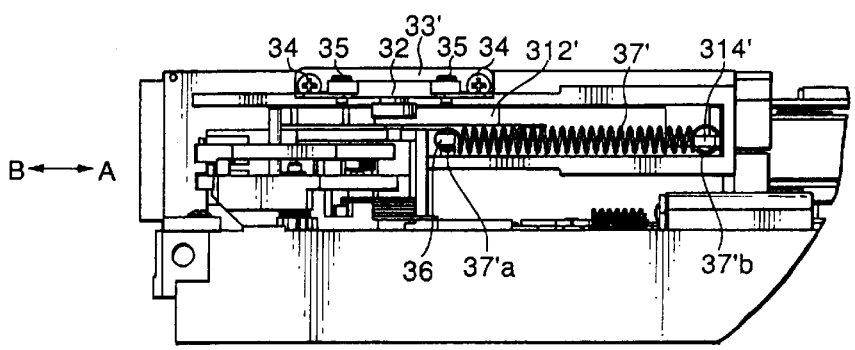
Figure 3A:
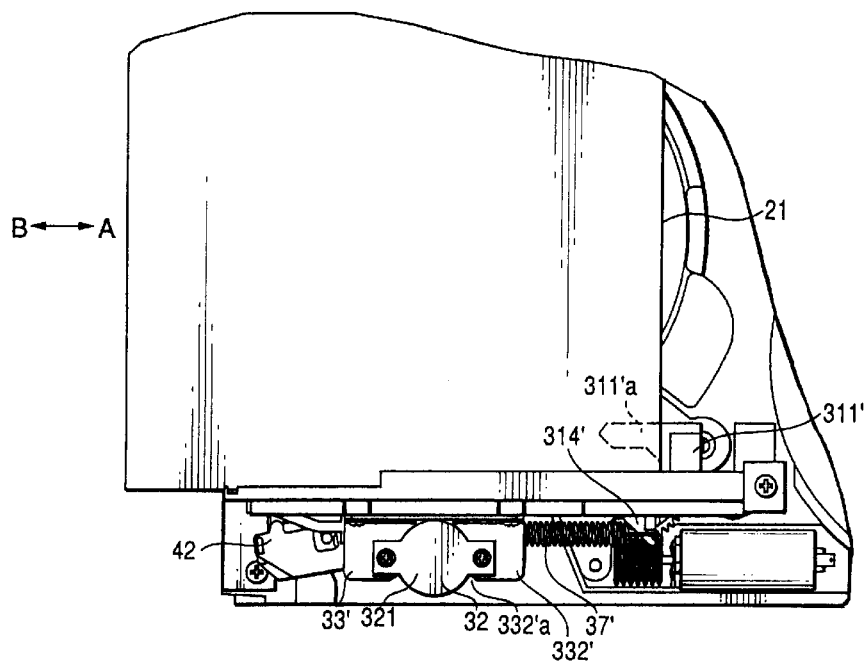
FIGS. 3A and 3B are a plan view and a right-hand side view collectively showing a state where the tape cartridge is ejected from the tape drive illustrated in FIG. 1, respectively.
Figure 3B:
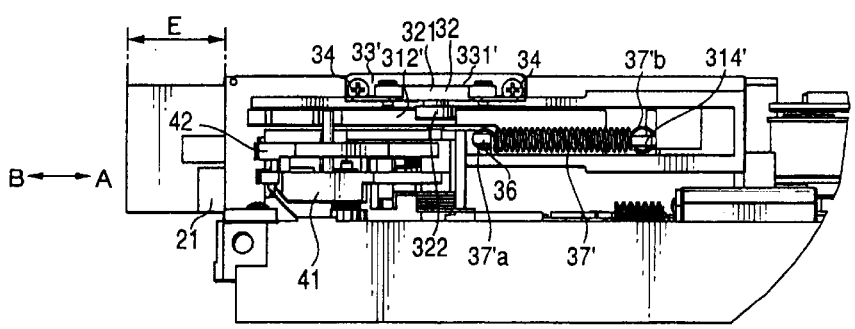

Referring to FIGS. 1, 2A, 2B, 3A and 3B, a conventional ejection mechanism will be described at first in order to facilitate an understanding of the present invention. FIG. 1 is a perspective view showing a tape drive including the conventional ejection mechanism with a tape cartridge and a view a state where the tape cartridge is ejected from the tape drive. FIGS. 2A and 2B are views collectively showing a state where the tape cartridge is inserted in the tape drive illustrated in FIG. 1. FIGS. 3A and 3B are views collectively showing a state where the tape cartridge is ejected from the tape drive illustrated in FIG. 1. Each of FIG. 2A and 3A is a plan view while each of FIGS. 2B and 3B is a right-hand side view. In addition, the illustrated ejection mechanism is mounted in a right-hand wall surface (a receiver right) of the tape drive.

Referring first to FIG. 1, the description will be direct to a schematic structure of the tape drive prior to description of the ejection mechanism. In addition, FIG. 1 illustrates only a part of the tape drive including the ejection mechanism with an upper cover removed therefrom, together with the tape cartridge.

The tape drive depicted at 10 is for receiving the tape cartridge depicted at 20 and contains a take-up reel (not shown) inside thereof. The take-up reel is also called a spool. The tape drive 10 is generally comprised of a rectangular housing 11 that has a common base 11a. The base 11a has two spindle motors. The first spindle motor has the spool (or the take-up reel) permanently mounted on the base 11a and the spool is dimensioned to accept a relatively high speed streaming magnetic tape (not shown). The second spindle motor is adapted to accept a removable tape cartridge 20. The removable tape cartridge 20 is manually or automatically inserted into the tape drive 10 via a slot 11b formed on the housing 11 of the tape drive 10 along an insertion direction depicted at A.

Upon insertion of the tape cartridge 20 into the slot 11b, the cartridge 20 engages the second spindle motor in a well-known manner in the art. Prior to rotation of the first and the second spindle motors, the tape cartridge 20 is connected to the permanently mounted spool by means of a mechanical buckling mechanism (not shown). A number of rollers (guide rollers) 12 positioned intermediate the tape cartridge 20 and the permanent spool guide the magnetic tape as it traverses at relatively high speeds back and forth between the tape cartridge 20 and the permanently mounted spool.

Referring now to FIGS. 2A, 2B, 3A, and 3B in addition to FIG. 1, the description will be made about the conventional ejection mechanism depicted at 30'.

The ejection mechanism 30', as apparent from FIG. 1, is mounted on the tape drive 10 at one surface of the right-hand wall surface (the receiver right) 11c (that is, a surface opposite to the slot 11b) thereof. The ejection mechanism 30' comprises an ejection lever 31' which extends in an insertion direction A. The ejection lever 31' is slidably mounted on the right-hand wall surface 11c in the insertion direction A and an opposite direction or an extraction (ejection) direction B (both of which will be collectively called an insertion/extraction direction A, B). The ejection lever 31' has, at an end 31'a of a back or rear side thereof, an engaging portion 311' which is perpendicularly bent at the slot 11b side so as to engage with a front end surface of the tape cartridge 20. The ejection lever 31' comprises, at about a center portion thereof, a rack 312' engaged with a pinion which will letter be described, although illustration is not clearly made in this figure.

The election mechanism 30' further comprises a damper 32 for absorbing all or a part of kinetic energy to stop a sliding movement of the ejection lever 31'. The damper 32 is held on a damper holder 33' which is fixed on the right-hand wall surface 11c by means of a pair of screws 34. More specifically, the damper holder 33' comprises a mounting surface 331' which is mounted and fixed on the right-hand wall surface 11c by means of the screws 34 and a damper holding surface 332' which is perpendicularly bent from the mounting surface 331' and which extends horizontally. The damper holding surface 332' has an opening 332'a at a center portion thereof. On the other hand, the damper 32 comprises a damper body 321 fixed on the damper holding surface 332' by means of a pair of screws 35 and the above-mentioned pinion 322 which is rotatably mounted on the damper body 321 through the opening 332'a. The pinion 322 engages with the rack 312' of the above-mentioned ejection lever 31'. In addition, the pinion 322 is disposed on the damper body 321 downward. At any rate, a combination of the damper 32 and the damper holder 33' serves as a damping member for braking or damping a movement of the ejection lever 31'.

In addition, the ejection lever 31' comprises a wider width portion 313' which extends between the rack 312' and the back side end 31'a. The wider width portion 313' had a wider width than the rack 313' downward. The right-hand wall surface 11c comprises a protrusion portion 36 which protrudes from the right-hand wall surface 11c at about a center thereof outwards.

The ejection mechanism 30' further comprises an ejection spring 37' which extends in the insertion/extraction direction A, B. The election spring 37' has an end 37'a connected to the above-mentioned protrusion portion 36. In addition, the election lever 31' comprises, at the above-mentioned back side end 31'a, a projection portion 314' which projects in an opposite side of the slot 11b. The projection portion 314' is connected to another end 37'b of the ejection spring 37'. That is, the ejection spring 37' acts as an urging arrangement for urging the ejection lever 31' in the ejection direction B.

In addition, the tape drive 10 comprises, at a side of the right-hand wall surface 11c, an interposition lever 41 and a write protection arm 42 which are rotatably mounted on the base 11a. The interposition lever 41 comprises a projection portion (not shown) inserted in a concave portion 21 bored in the tape cartridge 20 at a right-hand side surface thereof when the tape cartridge 20 is inserted in the tape drive 10. That is, by engaging the projection portion of the interposition lever 41 with the concave portion 21 of the tape cartridge 20, a state where the tape cartridge 20 is inserted in the tape drive 10 is maintained. A rotatable movement of the interposition lever 41 is controlled by a rotation movement of a cam (not shown) which is contained in the tape drive 10. In addition, the cam has a rotation center axis which is coaxial with a rotation axis of the above-mentioned second spindle motor.

Figure 4:
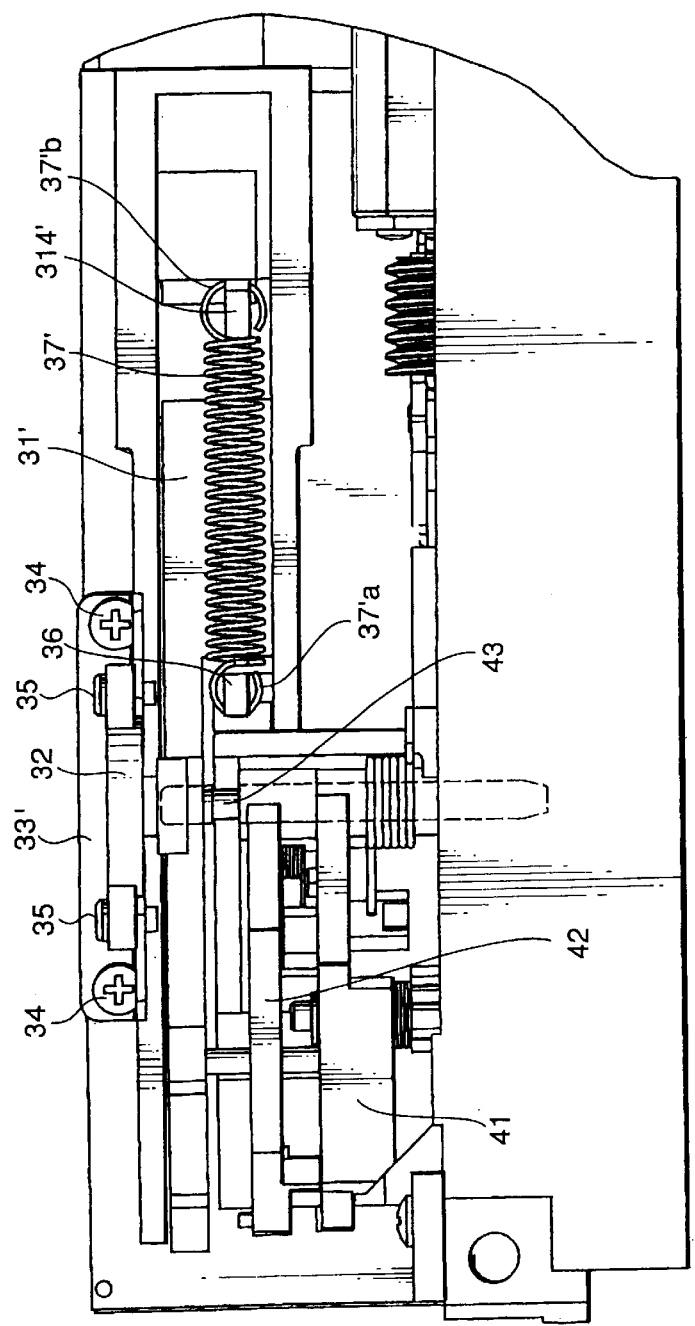
FIG. 4 is an enlarged right-hand side view in FIG. 3B.
Figure 5:
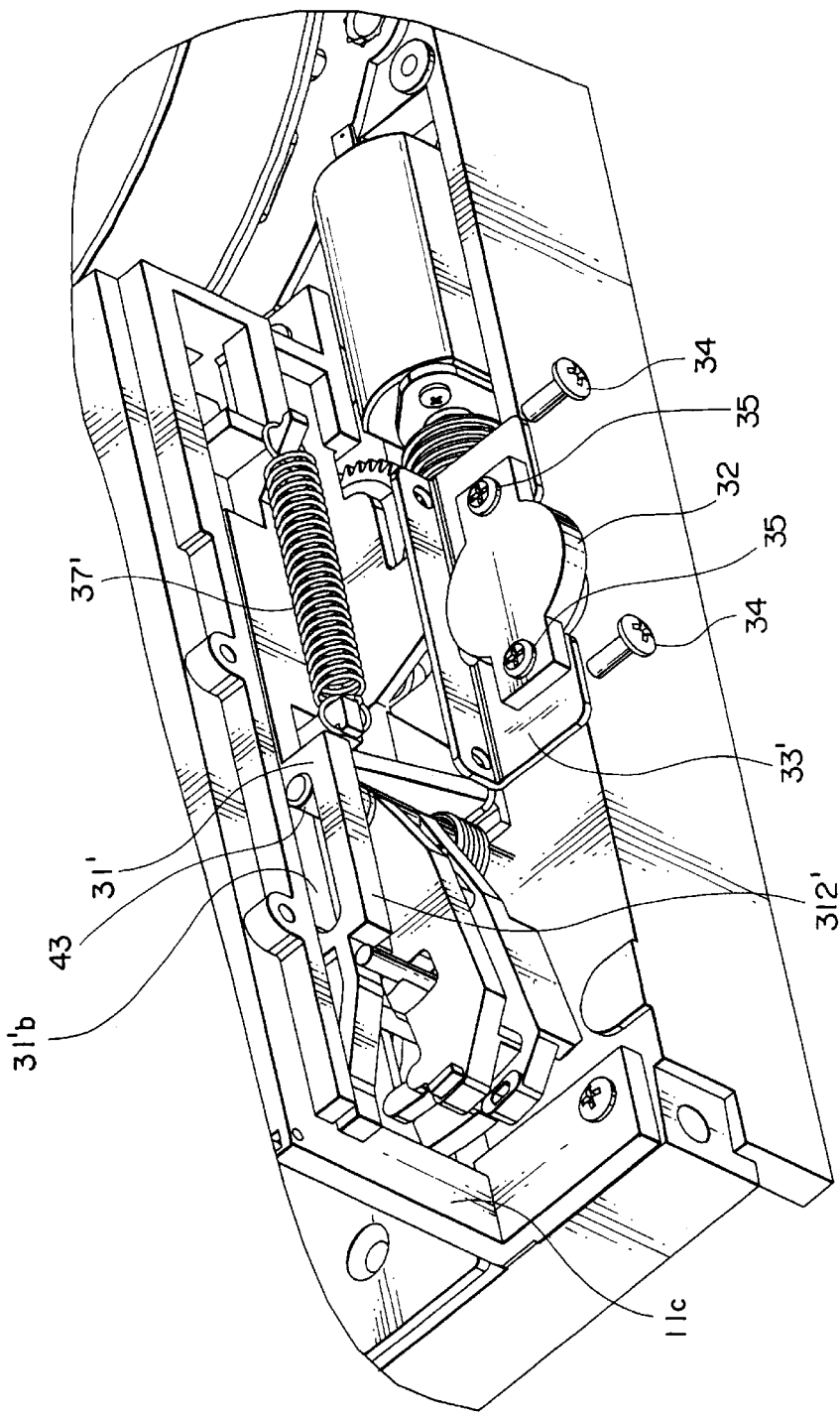
FIG. 5 is an enlarged exploded perspective view in FIG. 3B.

In addition, referring to also enlarged views of FIGS. 4 and 5, the tape drive 10 comprises a guide shaft 43 for guiding the ejection lever 31'. As shown in FIG. 4, the guide shaft 43 has an end inserted in a guide hole 31'b formed in the ejection lever 31' at a rear surface of the rack 312'. The guide shaft 43 also serves as a fulcrum shaft (a rotatable axis) of the interposition lever 41 and the write protection arm 42.

In recent years, techniques enable to increase or adjust an ejection amount of the ejection mechanism have been demanded so that persons having any trouble in his or her bodies do not have disadvantages on operating an apparatus and so that designs of peripheral units such as an automatic loader are facilitated.

However, as described above, inasmuch as the conventional ejection mechanism 30' has a limited ejection amount E due to the guide shaft 43 for guiding the ejection lever 31', the ejection amount E is always fixed or is constant. More specifically, in the conventional ejection mechanism 39', inasmuch as the guide shaft 43 acts as the fulcrum shaft for other arms (the interposition lever 41 and the write protection arm 42) or the like, it is difficult to adjust the ejection amount by shifting a position of the guide shaft 43.

On the other hand, it may be possible to adjust the ejection amount of the ejection mechanism by adding a movable stopper thereto as another part. However, such a structure is disadvantageous in that its production costs increase because the other part is added to the ejection mechanism 39'.

In addition, a widely increase of the ejection amount is not expected in a present arrangement for parts (the ejection amount E is equal to a constant of 15 mm in a present state) and it is difficult to cope with the above-mentioned demands.

Figure 6:
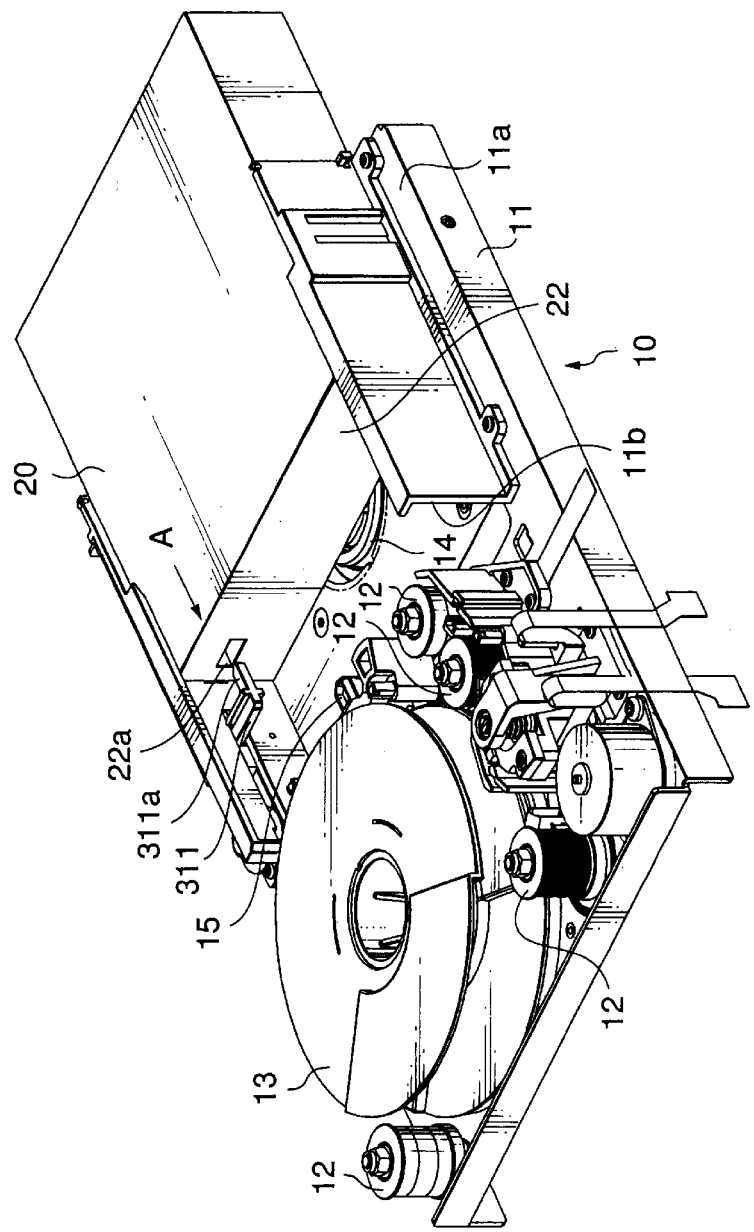
FIG. 6 is a perspective view schematically showing a tape drive to which an ejection mechanism according to this invention is applicable with an upper cover is removed therefrom, together with a tape cartridge inserted therein.

Referring now to FIG. 6, the description will proceed to a tape drive to which an ejection mechanism according to this invention is applicable. FIG. 6 is a perspective view, seen from oblique upper at a rear side, showing the tape drive with an upper cover removed therefrom, together with a tape cartridge inserted therein.

The tape drive depicted at 10 is for receiving the tape cartridge depicted at 20 and contains a take-up reel 13 inside thereof. The take-up reel 13 is also called a spool. The tape drive 10 is generally comprised of a rectangular housing 11 that has a common base 11a. The base 11a has a first spindle motor (not shown) and a second spindle motor 14. The first spindle motor has the spool (or the take-up reel) 13 permanently mounted on the base 11a and the spool 13 is dimensioned to accept a relatively high speed streaming magnetic tape (not shown). The second spindle motor 14 is adapted to accept the removable tape cartridge 20. The removable tape cartridge 20 is manually or automatically inserted into the tape drive 10 via a slot 11b formed on the housing 11 of the tape drive 10 along an insertion direction depicted at an arrow A.

Upon insertion of the tape cartridge 20 into the slot 11b, the tape cartridge 20 engages the second spindle motor 14 in a well-known manner in the art. Prior to rotation of the first and the second spindle motors, the tape cartridge 20 is connected to the permanently mounted spool 13 by means of a mechanical buckling mechanism 15. A number of rollers (guide rollers) 12 positioned intermediate the tape cartridge 20 and the permanent spool 13 guide the magnetic tape as it traverses at relatively high speeds back and forth between the tape cartridge 20 and the permanently mounted spool 13.

In addition, later described in more detail by referring to figures, the ejection mechanism depicted at 30 comprises an ejection lever 31. The ejection lever 31 comprises an engaging portion 311 having a projection portion 331a which is inserted in a cartridge hub lock releasing hole 22a bored in a front end surface 22 of the tape cartridge 20.

FIG. 7, 8A, 8B, 9A, 9B, 10, 11A, and 11B, the description will proceed to the ejection mechanism 30 according to an embodiment of this invention.

Figure 7:
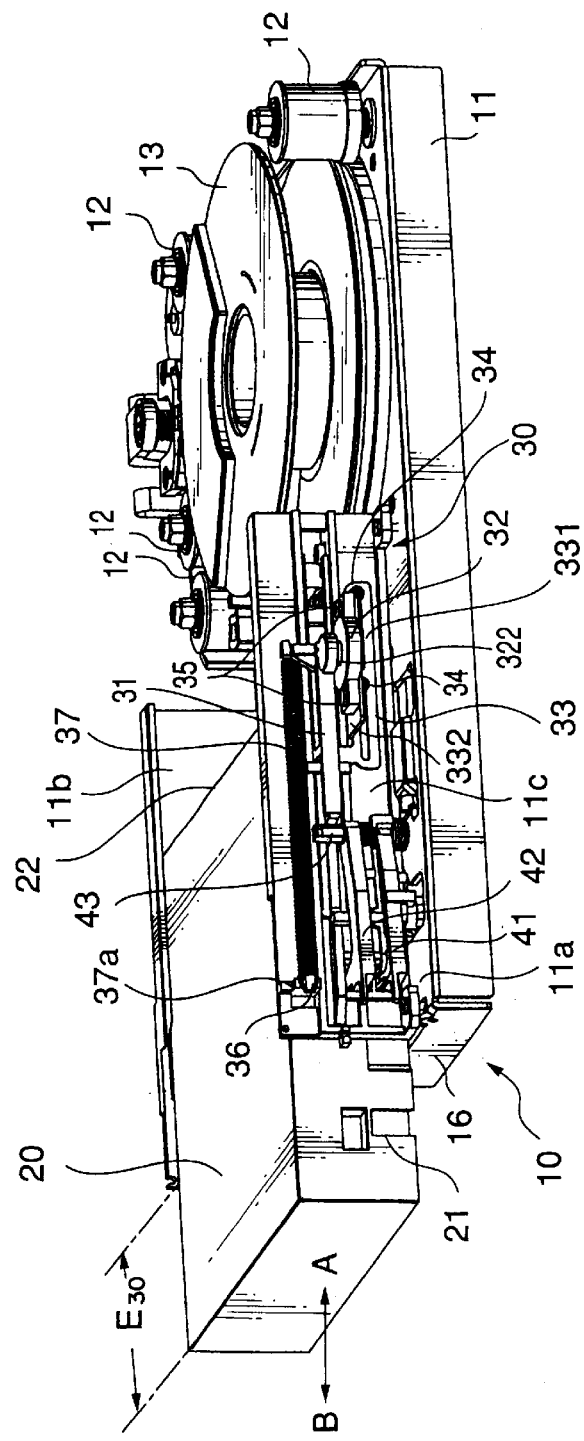
FIG. 7 is a perspective view showing a tape drive including an ejection mechanism according to an embodiment of this invention that has an ejection amount set (adjusted) to 30 mm, together with a tape cartridge inserted therein.
Figure 8A:
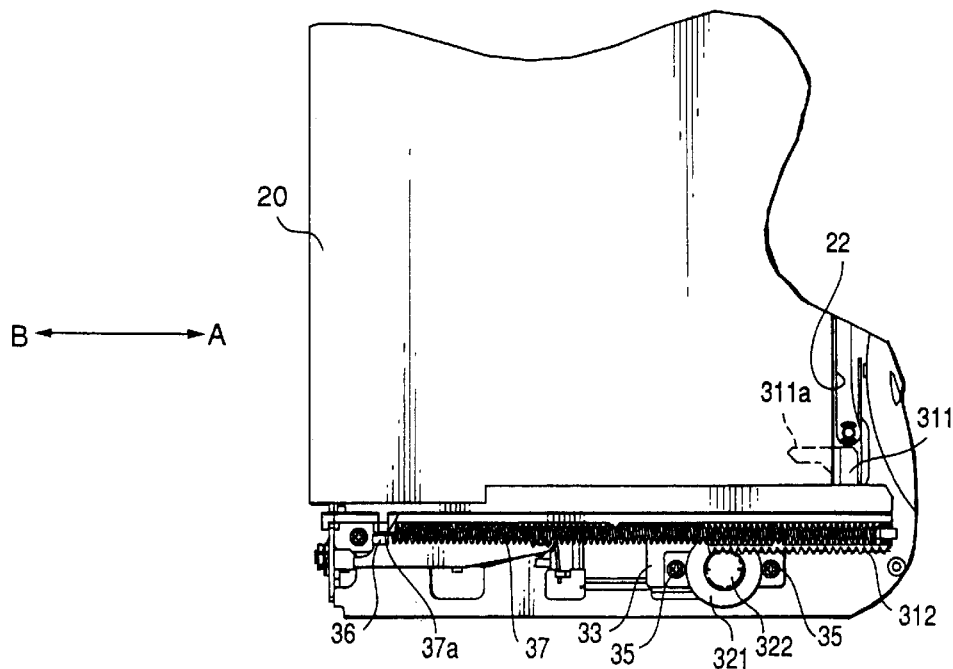
FIGS. 8A and 8B are a plan view and a right-hand side view collectively showing a state where the tape cartridge is inserted in the tape drive illustrated in FIG. 7, respectively.
Figure 8B:
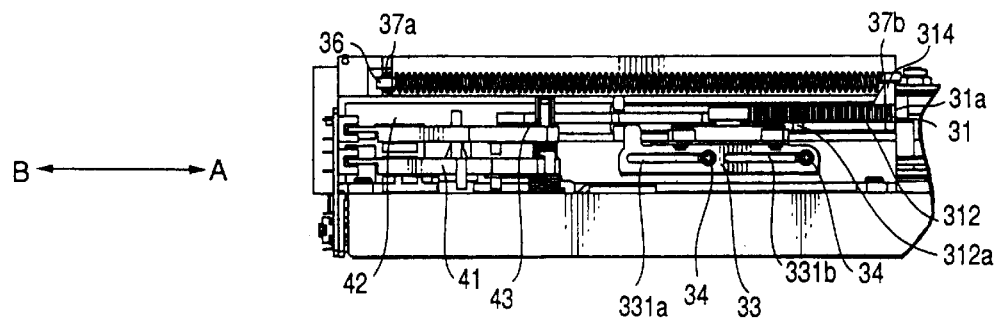
Figure 9A:
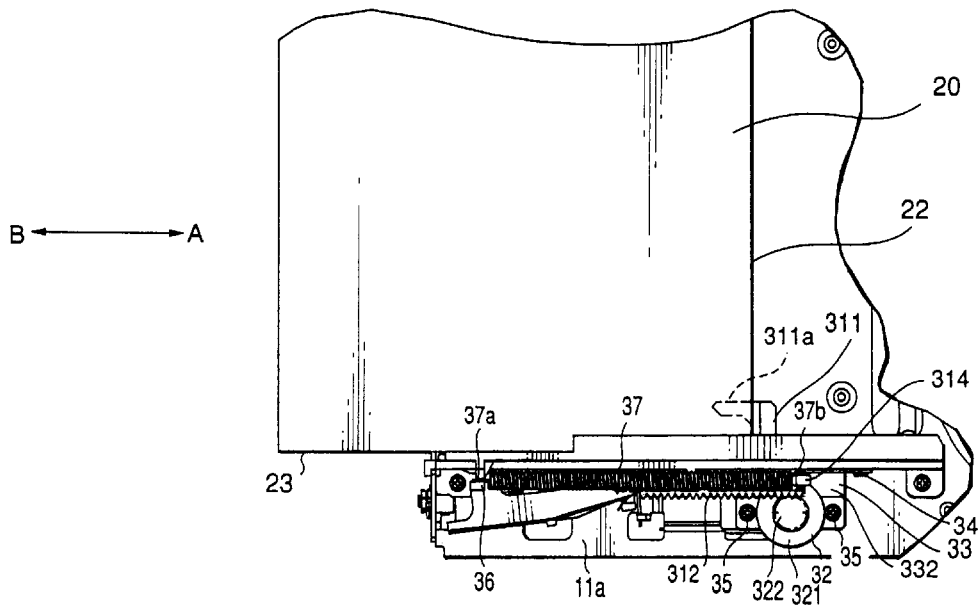
FIGS. 9A and 9B are a plan view and a right-hand side view collectively showing a state where the tape cartridge is ejected from the tape drive illustrated in FIG. 7, respectively.
Figure 9B:
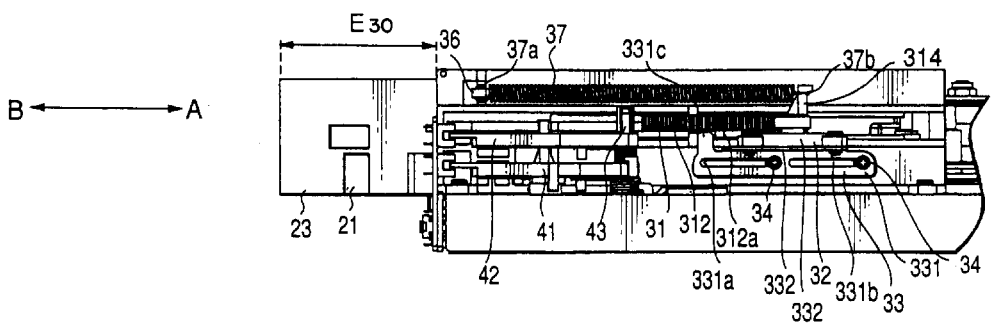

FIG. 7 is a perspective view showing the tape drive 10 including the ejection mechanism 30 in which an ejection amount E is set (adjusted) to an amount $E_{30}$ of 30 mm together with the tape cartridge 20 and is a view showing a state where the tape cartridge 20 is ejected from the tape drive 10. FIGS. 8A and 8B are views collectively showing a state where the tape cartridge 20 is inserted in the tape drive 10 illustrated in FIG. 7. FIGS. 9A and 9B are views collectively showing a state where the tape cartridge 20 is ejected from the tape drive 10 illustrated in FIG. 7. Each of FIGS. 8A and 9A is a plan view while each of FIGS. 8B and 9B is a right-hand side view.

Figure 10:
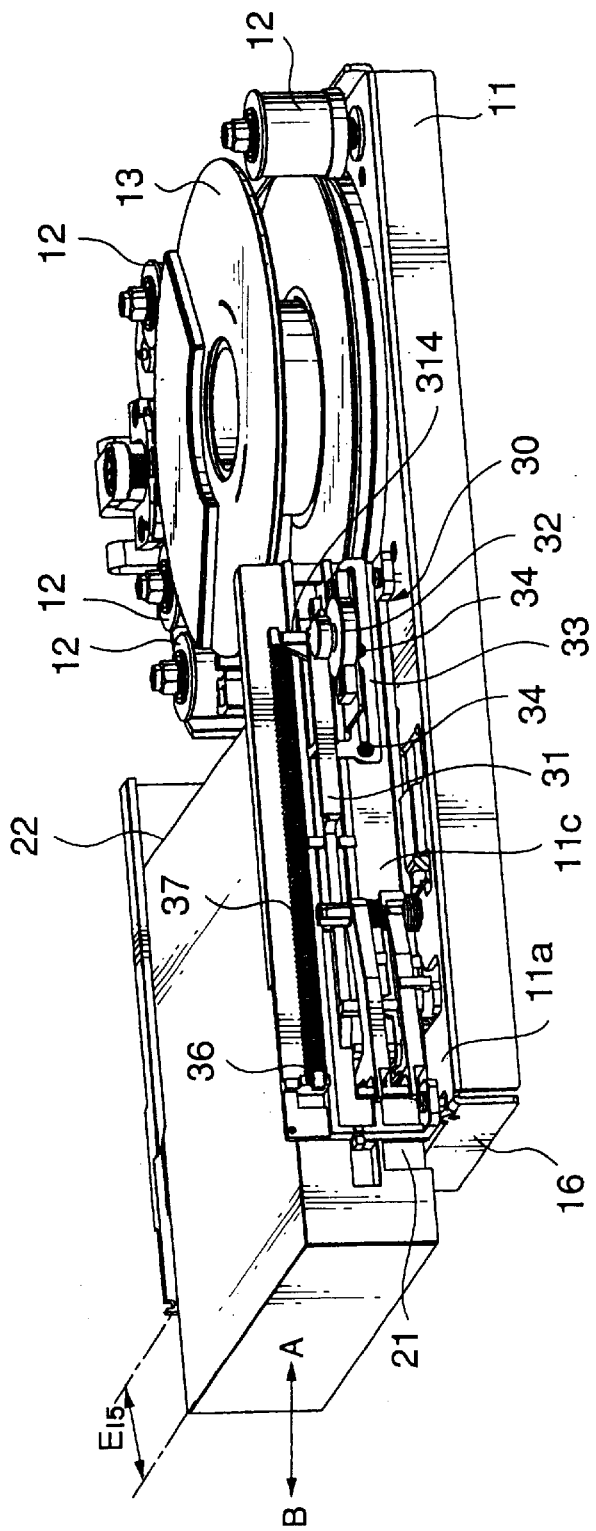
FIG. 10 is a perspective view, similar to FIG. 7, showing a tape drive including an ejection mechanism according to the embodiment of this invention that has an ejection amount set (adjusted) to 15 mm, together with a tape cartridge inserted therein.
Figure 11A:
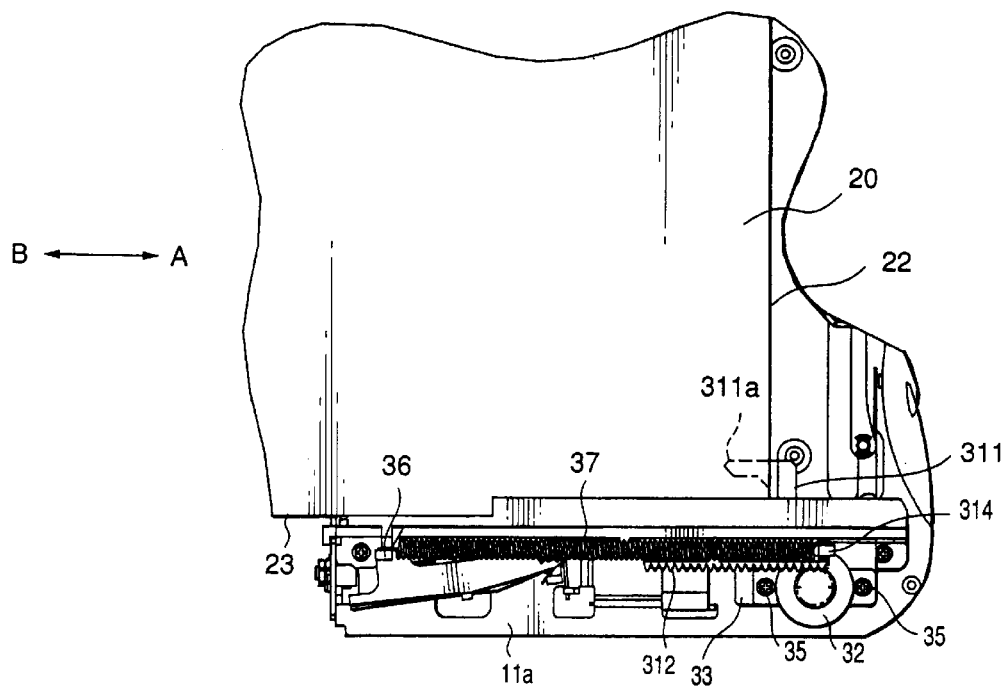
FIGS. 11A and 11B are a plan view and a right-hand side view collectively showing a state where the tape cartridge is ejected from the tape drive illustrated in FIG. 10, respectively.
Figure 11B:
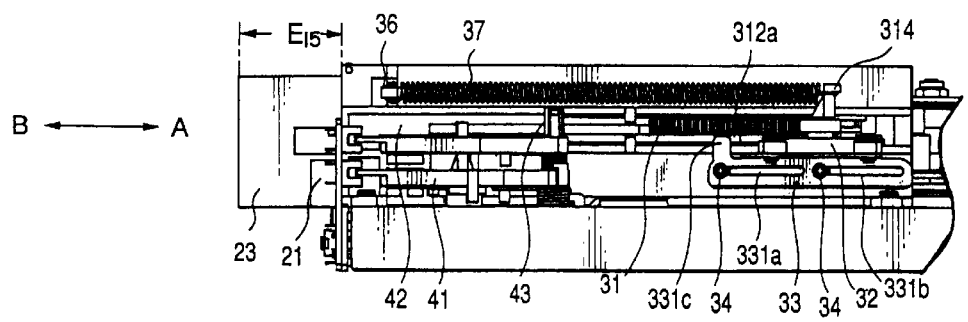

FIG. 10 is a perspective view showing the tape drive 10 including the ejection mechanism 30 in which the ejection amount E is set (adjusted) to an amount $E_{15}$ of 15 mm together with the tape cartridge 20 and is a view showing a state where the tape cartridge 20 is ejected from the tape drive 10. FIGS. 11A and 11B are views collectively showing a state where the tape cartridge 20 is ejected from the tape drive 10 illustrated in FIG. 10. FIG. 11A is a plan view while FIG. 11B is a right-hand side view.

The illustrated ejection mechanism 30 is mounted on a right-hand wall surface (receiver right) of the tape drive 10.

As is apparent from FIGS. 7 and 10, the ejection mechanism 30 is mounted on one surface of the right-hand wall surface (the receiver right) 11c (that is, an opposite surface to the slot 11b) of the tape drive 10. The ejection mechanism 30 comprises an ejection lever 31 extending in the insertion direction A. The ejection lever 31 is slidably mounted on the right-hand wall surface 11c in the insertion direction A and in an opposite direction or an extraction (ejection) direction B (both of which will be collectively called an insertion/extraction direction A, B).

The ejection lever 31 comprises, at a back side end 31a thereof, an engaging portion 311 which is perpendicularly bent to a side of the slot 11c so as to engage with the front end surface 22 of the tape cartridge 20. The engaging portion 311 has, at a tip portion thereof, the projection portion 331a which projects in the extracting direction B. As described above, the projection portion 311a is inserted in the cartridge hub lock releasing hole 22a (FIG. 6) bored in the front end surface 22 of the tape cartridge 20. In addition, the ejection lever 31 comprises a rack 312 engaged with a pinion described hereinafter, that extends between a center thereof and the back side thereof, as illustrated in FIG. 8A, 8B, 9A, 9B, 11A, and 11B. The rack 312 has a length which is longer than 30 mm by a little.

The ejection mechanism 30 further comprises a damper 32 for absorbing all or a part of kinetic energy in order to stop a sliding operation of the ejection lever 31. The damper 32 is held by a damper holder 33. Although the damper holder 33 is fixed on the right-hand wall surface 11c by using a pair of screws 34, 34, a fixed position of the damper holder 33 is adjustable in the manner which will later become clear.

More specifically, the damper holder 33 has a mounting surface 331 which is mounted and fixed on the right-hand wall surface 11c by using the pair of the screws 34, 34 and a damper holding surface 332 which is perpendicularly bent from the mounting surface 331 and which extends horizontally. In addition, the right-hand wall surface 11c has a pair of threaded holes (not shown) for screwing the pair of the screws 34, 34 into the right-hand wall surface 11c. As shown in FIG. 8B, 9B, and 11B, the mounting surface 331 has a pair of long holes 331a, 331b bored therein. The pair of the long holes 331a, 331b extend in the insertion/extraction direction A, B with apart from each other. Each of the long holes 331a, 331b has a predetermined length. In the example being illustrated, the predetermined length of each long hole 331a, 331b is equal to about 15 mm. Accordingly, the mounting surface 331 is fixed on the receiver right 11c by screwing the pair of the screws 34, 34 in the receiver right 11c through the pair of the long holes 331a, 331b. As described above, it is possible to adjust a mounting position of the damper holder 33 to the receiver right 11c by forming the long holes 331a, 331b each having the predetermined length in the mounting surface 331. As a result, it is also possible to adjust a position of the damper 32. Accordingly, it is possible to optionally set the ejection amount E in the ejection mechanism 30 at a range between 15 mm and 30 mm. At any rate, a combination of the pair of the long holes 331a, 331b and the pair of the screws 34, 34 serves as a mounting adjusting arrangement for adjusting the mounting position for the damper holder 33 to the receiver right 11c.

Figure 12:
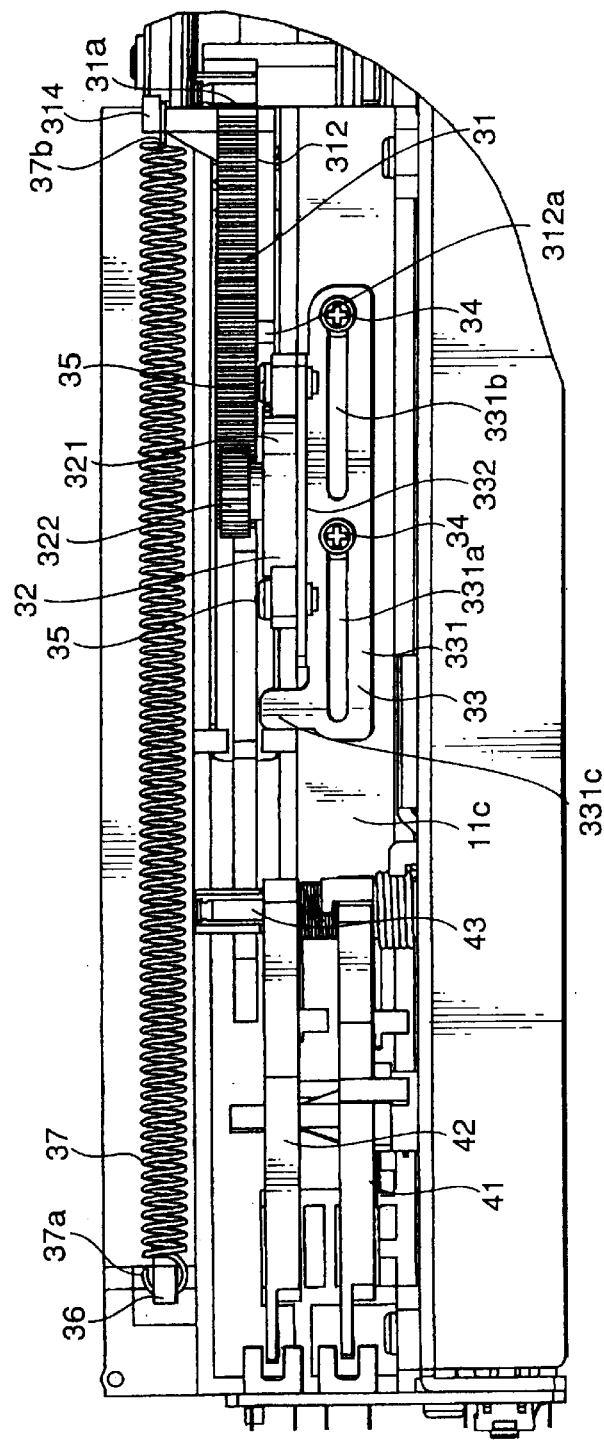
FIG. 12 is an enlarged right-hand side view in FIG. 8B.

In addition, as shown in an enlarged view of FIG. 12, the mounting surface 331 has a damper holder stopper portion 331c extending upwards at a front side end thereof.

On the other hand, the damper 32 comprises a damper body 321 fixed on the damper holding surface 332 by using a pair of screws 35, 35 and the above-mentioned pinion 322 which is rotatably mounted on the damper body 321. The pinion 322 engages with the above-mentioned rack 312 of the election lever 31. In addition, the pinion 322 is disposed on the damper body 321 upwards. At any rate, a combination of the damper 32 and the damper holder 33 acts as a damping member for braking or damping the movement of the ejection lever 31.

In addition, as shown in FIG. 12, the ejection lever 31 has an ejection lever stopper portion 312a projecting from about a center of the rack 312 downward. When the tape cartridge 20 is ejected from the tape drive 10 by the ejection mechanism 30 on ejecting, the tape cartridge 20 is ejected up to a position where the ejection lever stopper portion 312a of the ejection lever 31 engages with the above-mentioned damper holder stopper portion 331c of the damper holder 33. In other words, a separation distance between the ejection lever stopper portion 312a and the damper holder stopper portion 331c in a state where the tape cartridge 20 is inserted in the tape drive (that is merely called a "separation distance") corresponds to the ejection amount E of the ejection mechanism 30. At any rate, the damper holder stopper portion 331c acts, in cooperation with the ejection lever stopper portion 312a, as a stopper for stopping the movement of the ejection lever 31.

As shown in FIG. 7, 8A, 8B, 9A, and 9B, the above-mentioned separation distance has the longest distance in a case where the damper holder 33 (the damper 32) is mounted and fixed on the receiver right 10c at the most front side or in a case where the pair of the screws 34, 34 are screwed through the long holes 331a, 331b at the most back side thereof. In this event, the ejection amount E is set and adjusted to the longest amount $E_{30}$ of 30 mm.

On the other hand, as shown in FIGS. 10, 11A, and 11B, the above-mentioned separation distance has the shortest distance in a case where the damper holder 33 (the damper 32) is mounted and fixed on the receiver right 10c at the most back side or in a case where the pair of the screws 34, 34 are screwed through the long holes 331a, 331b at the most front side thereof. In this event, the ejection amount E is set and adjusted to the shortest amount $E_{15}$ of 15 mm.

The ejection mechanism 30 further comprises an ejection spring 37 extending in the insertion/extraction direction A, B. The ejection spring 37 has an end 37a connected to a protrusion portion 36 protruding from the receiver right 11c at a front side of the tape driver 10. In addition, the ejection lever 31 has, at the above-mentioned back side end 31a, a projection portion 314 projecting upwards. The ejection spring 37 has another end 37b connected to the projection portion 314. The ejection spring 37 always urges the ejection lever 31 in the extraction (ejection) direction B. At any rate, the ejection spring 37 is operable as an urging arrangement for urging the ejection lever 37 in the ejection direction B.

In addition, the tape drive 10 comprises, at a side of the right-hand wall surface 11c, an interposition lever 41 and a write protection arm 42 which are rotatably mounted on the base 11a. The interposition lever 41 comprises a projection portion (not shown) inserted in a concave portion 21 bored in a right-hand surface 23 of the tape cartridge 20 when the tape cartridge 20 is inserted in the tape drive 10. That is, by engaging the projection portion of the interposition lever 41 with the concave portion 21 of the tape cartridge 20, a state where the tape cartridge 20 is inserted in the tape drive 10 is maintained. A rotatable movement of the interposition lever 41 is controlled by a rotation movement of a cam (which will later be described) contained in the tape drive 10. In addition, the cam has a rotation center axis which is coaxial with a rotation axis of the above-mentioned second spindle motor.

In addition, the tape drive 10 comprises a guide shaft 43. The guide shaft 43 serves as a fulcrum axis of the interposition lever 41 and the write protection arm 42.

Referring to FIGS. 13, 14, 15, 16, and 17, the description will proceed to a relationship between the interposition lever 41 and the cam depicted at 50.

Figure 13:
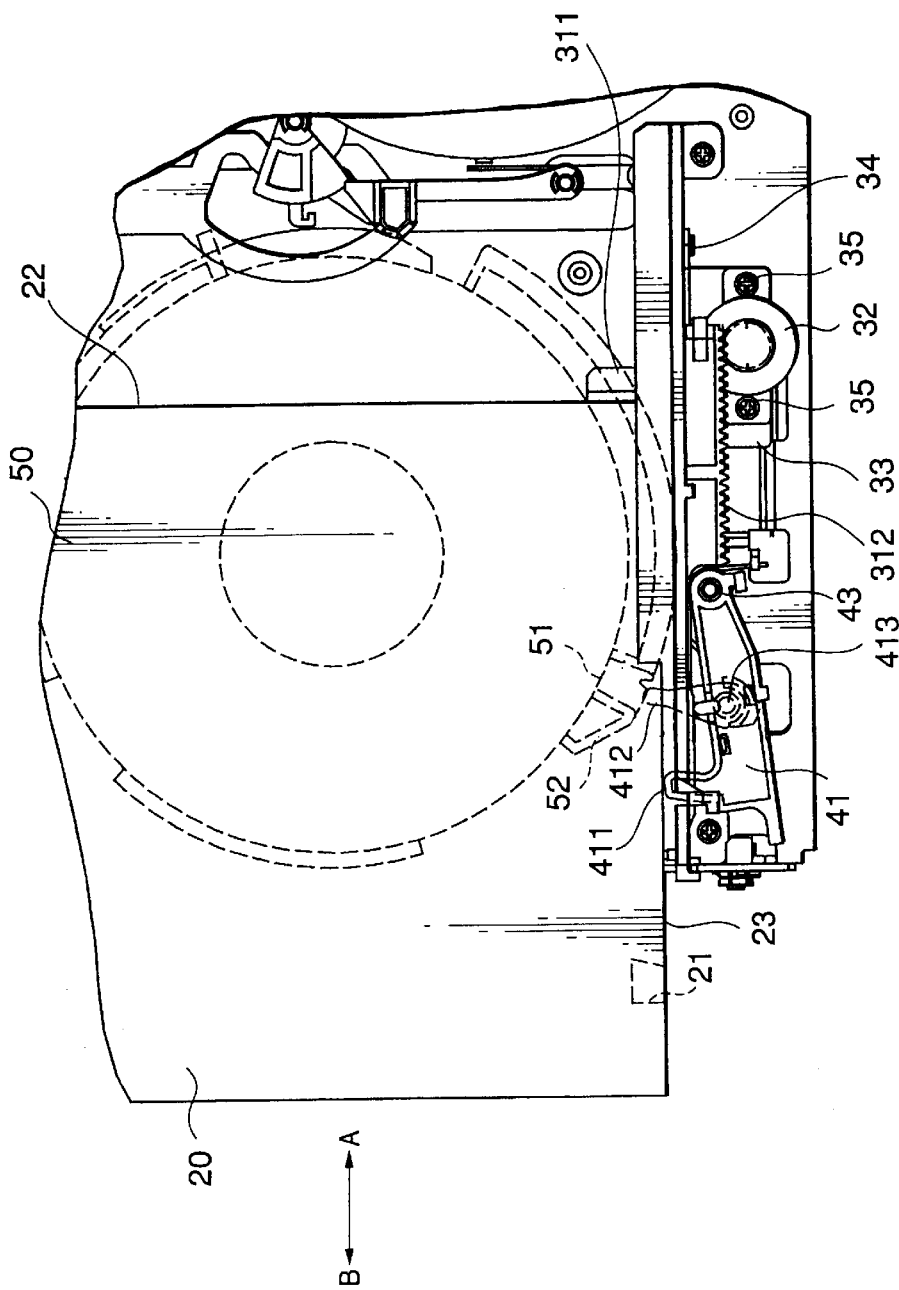
FIG. 13 is a plan view showing a relationship between an interposition lever and a cam on starting insertion of the tape cartridge (on completion of ejection of the tape cartridge)
Figure 14:
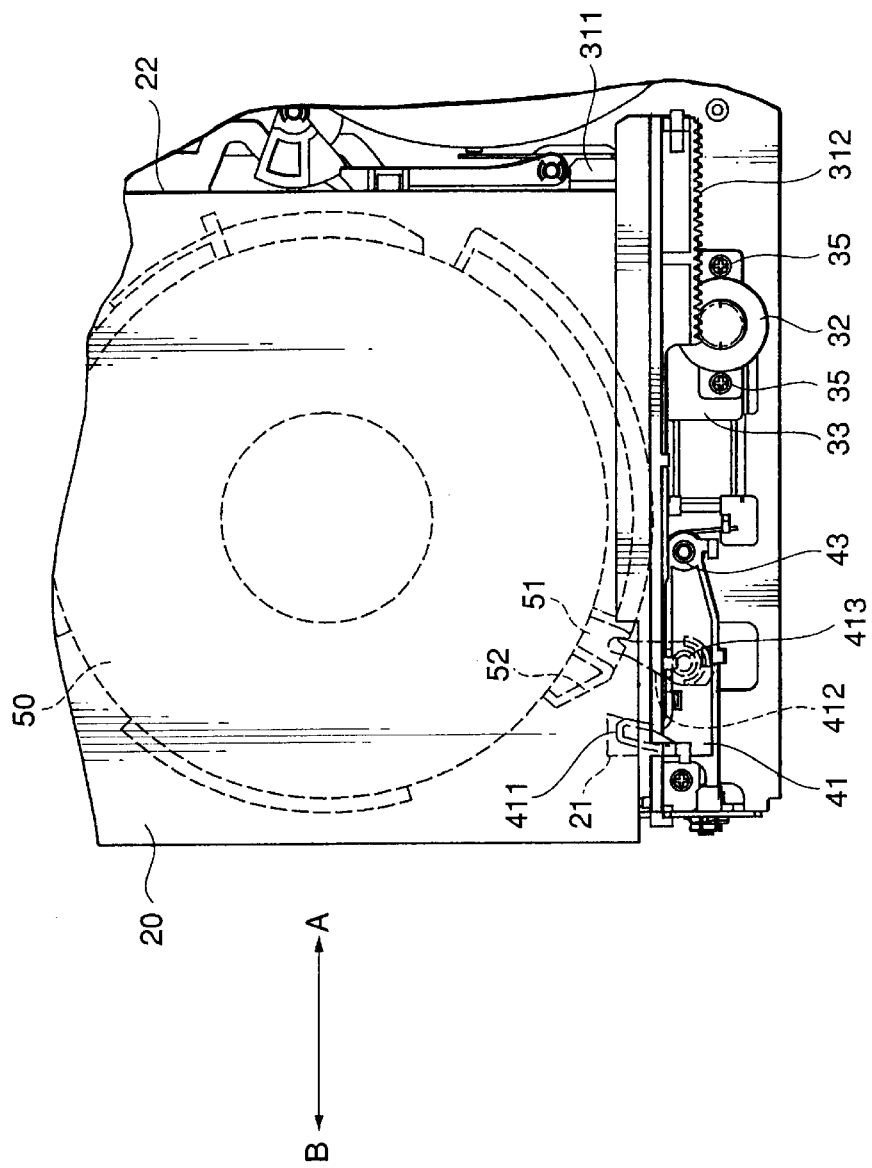
FIG. 14 is a plan view showing a relationship between the interposition lever and the cam on completion of insertion of the tape cartridge.
Figure 15:
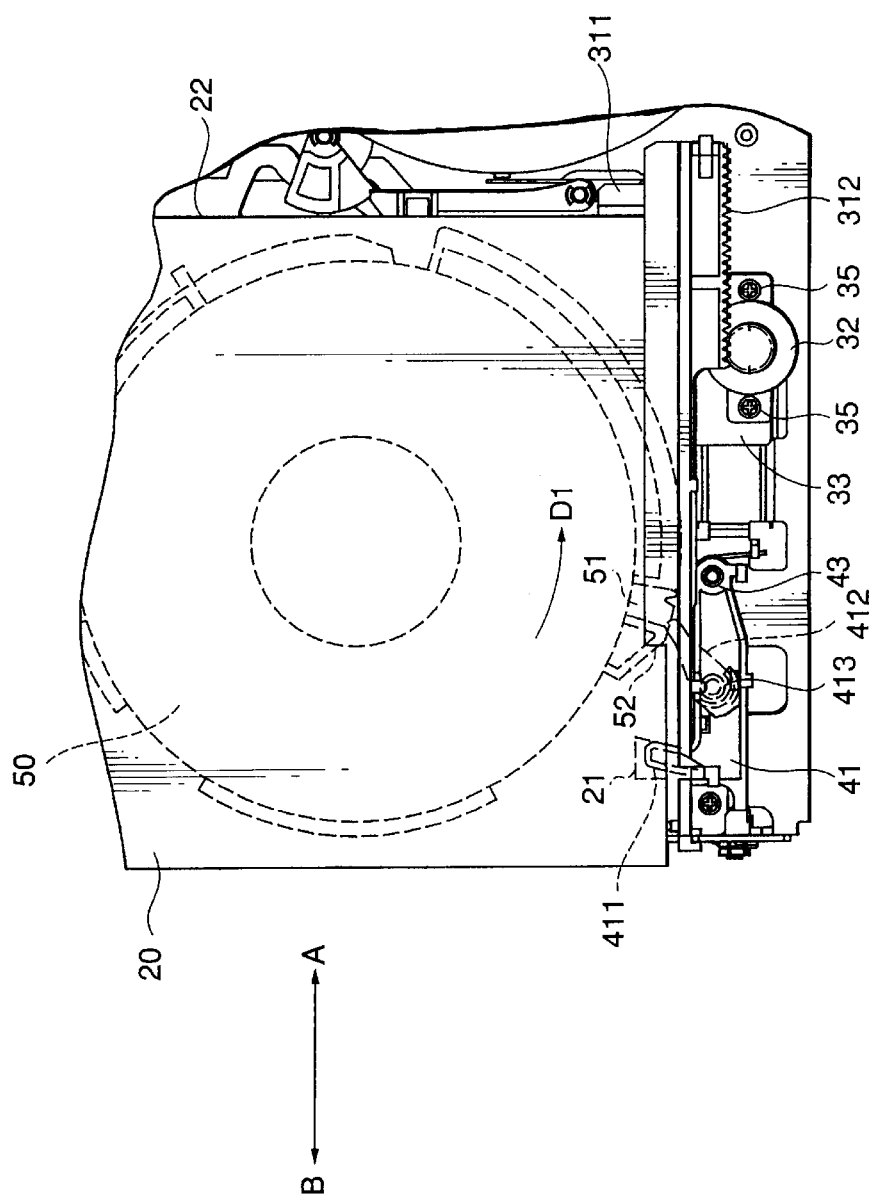
FIG. 15 is a plan view showing a relationship between the interposition lever and the cam on starting of loading.
Figure 16:
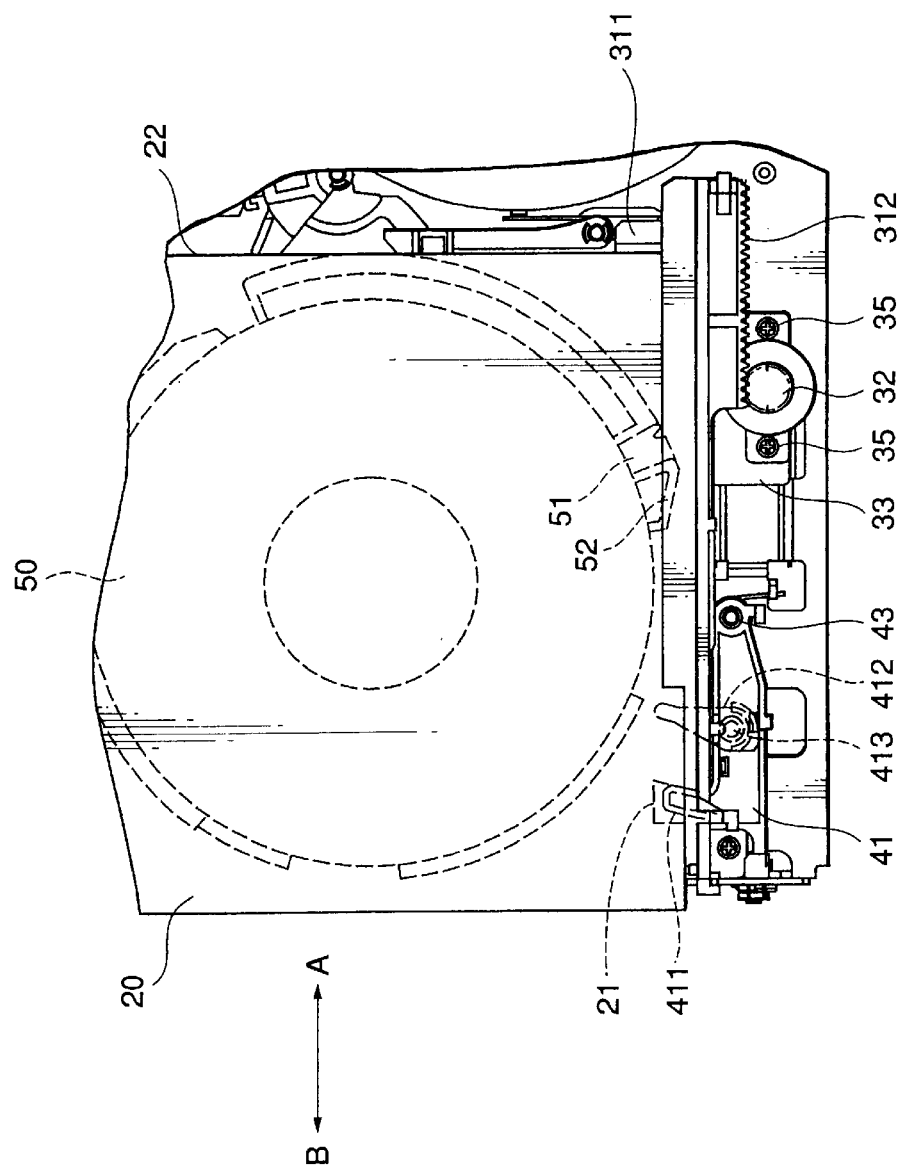
FIG. 16 is a plan view showing a relationship between the interposition lever and the cam on completion of the loading.
Figure 17:
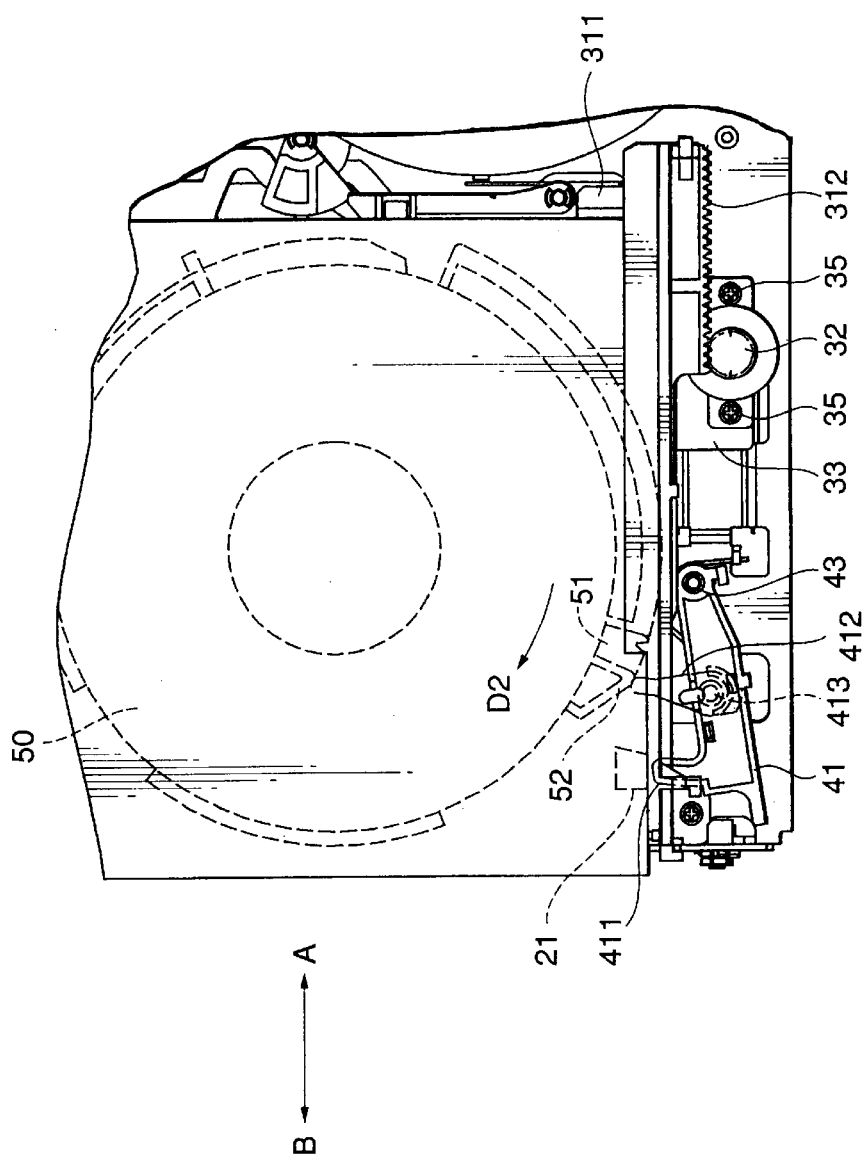
FIG. 17 is a plan view showing a relationship between the interposition lever and the cam on operating of ejection.

FIG. 13 is a plan view showing the relationship between the interposition lever 41 and the cam 50 on starting of insertion of the tape cartridge 20. FIG. 13 also shows the relationship between the interposition lever 41 and the cam 50 on completion of ejection for the tape cartridge 20. FIG. 14 is a plan view showing the relationship between the interposition lever 41 and the cam 50 on completion of the insertion of the tape cartridge 20. FIG. 15 is a plan view showing the relationship between the interposition lever 41 and the cam 50 on starting of loading. FIG. 16 is a plan view showing the relationship between the interposition lever 41 and the cam 50 on completion of the loading. FIG. 17 is a plan view showing the relationship between the interposition lever 41 and the cam 50 on operating of the ejection for the tape cartridge 20. The cam 50 is also called a loading ring and comprises a circular disk-shaped member. In FIGS. 13 through 17, the tape drive 10 includes the ejection mechanism 30 having the ejection amount E which is set to the longest amount $E_{30}$ of 30 mm.

The interposition lever 41 comprises a projection portion 411 and a rotatable lever 412. The projection portion 411 is engaged with the concave portion 21 of the tape cartridge 20 when the tape cartridge 20 is inserted in the tape drive 10. The rotatable lever 412 has a tip extending toward the cam 50 and is rotatably mounted on the interposition lever 41 around a rotatable shaft 413. Although the rotatable lever 412 is always urged to rotate around the rotatable shaft 413 in a counterclockwise direction by means of an urging arrangement such as a spring (not shown), rotation of the rotatable lever 412 in the counterclockwise direction is stopped to a position shown in FIG. 13 by means of a stopper which is not shown. However, if any external force acts to the tip of the rotable lever 412 so as to rotate the tip of the rotable lever 412 in a clockwise direction, the rotatable lever 412 may be rotatable around the rotable shaft 413 in the clockwise direction with resistant to urging force of the urging arrangement.

On the other hand, the cam 50 comprises a cam ditch 51 and a cam face 52 adjacent to the cam ditch 51 in a clockwise direction. Before the tape cartridge 20 is inserted in the tape drive 10, the tape drive 10 is put into a state where the tip of the rotatable lever 412 is opposed to the cam ditch 51 as shown in FIG. 13.

Referring first to FIGS. 13 and 14 in addition to FIG. 7, 8A, 8B, 9A, and 9B, description will be made as regards operation in a case of inserting the tape cartridge 20 in the tape drive 10.

While the tape cartridge 20 is inserted in the slot 11b of the tape drive 10 in the insertion direction A, the interposition lever 41 is put into the state where the interposition lever 41 is rotated around the guide shaft 43 in a counter-clockwise direction with resistant to the urging arrangement such as a spring (not shown). When insertion of the tape cartridge 20 is continued, as shown in FIGS. 9A, 9B, and 13, the front end surface 22 of the tape cartridge 20 is engaged with the engaging portion 311 of the ejection lever 31. When the insertion of the tape cartridge 20 is further continued with resistant to urging force of the ejection spring 31 with this engaged state, an engagement between the ejection lever stopper portion 312a of the ejection lever 31 and the damper holder stopper portion 331c of the damper holder 33 is released.

When the insertion of the tape cartridge 20 is further continued, the projection portion 411 of the interposition lever 41 is engaged with the concave portion 21 of the tape cartridge 20 by rotating the interposition lever 41 around the guide shaft 43 in the clockwise direction with resistant to the urging force of the urging arrangement, as shown in FIG. 14. In this event, the interposition lever 41 is put into a state where the tip of the rotatable lever 412 is inserted in the cam ditch 51 of the cam 50. Accordingly, the tape cartridge 20 is perfectly inserted in the slot 11b of the tape drive 10 with the ejection spring 37 grown at a maximum, as shown in FIGS. 8A and 8B. After the insertion of the tape cartridge 20 is completed, loading is carried out. The loading is carried out by rotating the cam 50 in a counterclockwise direction. In addition, driving of the cam 50 is carried out by a driving arrangement which comprises a motor and a row of gears which are not illustrated. The driving of the driving arrangement is controlled by a control unit which is not illustrated.

Referring now to FIGS. 15 and 16, description will be made as regards operation of the loading. When completion of the insertion for the tape cartridge 20 to the tape drive is delivered to the control unit by a detected signal from any detection arrangement (not shown), the control unit controls the driving of the driving arrangement so as to rotate the cam 50 in a counterclockwise direction depicted at an arrow D1, as shown in FIG. 15. When the cam 50 rotates in the counterclockwise direction D1, the cam face 52 of the cam 50 is engaged with the tip of the rotatable lever 412 of the interposition lever 41. As a result, with rotation of the cam 50 in the counterclockwise direction D1, the rotatable lever 412 rotates around the rotatable shaft 413 in the clockwise direction with resistant to the urging arrangement.

When the cam 50 further continues to rotate in the counterclockwise direction D1, engagement between the cam face 52 of the cam 50 and the tip of the rotatable lever 412 is released, and the rotatable lever 412 rotates around the rotatable shaft 413 in the counterclockwise direction owing to the urging force of the urging arrangement to return to an original state. When the cam 50 rotates in the counterclockwise direction D1 by a predetermined angle by the driving arrangement, the loading is completed. A state where the loading is completed is illustrated in FIG. 16.

Referring now to FIGS. 17 and 13 in addition to FIGS. 7, 8A, 8B, 9A, and 9B, description will be made as regards operation in a case of ejecting the inserted tape cartridge 20 from the tape drive 10.

On a front bezel 16 of the tape drive 10, an ejection bottom (not shown) is provided. When an operator operates (pushes) the ejection bottom, an ejection command is delivered to the above-mentioned control unit. Responsive to the ejection command, the control unit controls the driving of the driving arrangement so as to rotate the cam 50 from a state shown in FIG. 16 in a clockwise direction depicted at an arrow D2 by the above-mentioned angle, as shown in FIG. 17.

By rotating the cam 50 in the clockwise direction D1 in the manner described above, the tip of the rotatable lever 412 of the interposition lever 41 is engaged with the cam face 52 of the cam 50, as shown in FIG. 17. Inasmuch as the rotation of the rotatable lever 412 is stopped around the rotatable shaft 413 in the counterclockwise direction, the rotatable shaft 413 cannot rotate around the rotatable shaft 413 in the counterclockwise direction. Therefore, as shown in FIG. 17, the tip of the rotatable lever 412 runs (slidably moves) on the cam face 52 without rotation of the rotatable lever 412. As a result, the interposition lever 41 itself rotates around the guide shaft 43 in the counterclockwise direction. Accordingly, as shown in FIG. 17, engagement between the projection portion 411 of the interposition lever 41 and the concave portion 21 of the tape cartridge 20 is released.

By releasing of this engagement, the ejection mechanism 30 operates so as to slidably move the ejection lever 31 in the extraction (ejection) direction B caused by an action of the urging force of the ejection spring 37. Inasmuch as the engaging portion 311 of the ejection lever 31 is engaged with the front end surface 21 of the tape cartridge 20, the tape cartridge 20 also slidably moves in the extraction (ejection) direction B with sliding operation of the ejection lever 31. In addition, inasmuch as the rack 312 of the ejection lever 31 is engaged with the pinion 332 of the damper 32, the movement of the ejection lever 31 is braked or damped by the damper 32 so that the tape cartridge 20 slidably moves in the extraction (ejection) direction B at a slow speed. In this event, as shown in FIG. 13, the tip of the projection portion 411 of the interposition lever 41 is slidably in contact with the right-hand surface 23 of the tape cartridge 20.

The above-mentioned sliding operation of the ejection lever 31 (the tape cartridge 20) is carried out until the ejection lever stopper portion 312a of the ejection lever 31 is in contact with the damper holder stopper portion 331c of the damper holder 33, as shown in FIGS. 9A and 9B. That is, when the ejection lever stopper portion 312a is in contact with the damper holder stopper portion 331c, the sliding operation of the ejection lever 31 (the tape cartridge 20) stops. Under the circumstances, the ejection amount E in the ejection mechanism 30 is equal to about 30 mm.

Although the description has been made in a case where the ejection amount E in the ejection mechanism 30 is set to 30 mm in the above-mentioned operation description, it may be possible to shorten the above-mentioned ejection amount E up to about 15 mm by setting and adjusting a mounting portion of the damper holder 33 to the receiver right 11c, as shown in FIGS. 10, 11A, and 11B. That is, it is possible to optionally set or adjust the ejection mechanism 30 in a range between 15 mm and 30 mm with reference to the front bezel 16.

Inasmuch as it is unnecessary to add another part such as a movable stopper to the ejection mechanism to adjust the ejection amount E, costs of the ejection mechanism 30 is not increased. As described above, it is possible in the ejection mechanism 30 according to the embodiment of this invention to drastically increase the ejection amount E in comparison with the conventional ejection mechanism 30' by changing arrangement of the parts. With this, it is possible to reduce a spring constant of the ejection spring 37 in comparison with that of the conventional spring 37' and it is possible to resolve problems in ejection force and insertion force of the tape cartridge 20. In other words, it is possible to sufficiently secure a space for arranging the ejection spring 37 so as to enable to reduce the spring constant of the ejection spring 37.

While this invention has thus far been described in conjunction with a preferred embodiment thereof, it is to be understood that modifications will be apparent to those skilled in the art without departing from the spirit of the invention. For example, although the above-mentioned embodiment describes as regards the ejection mechanism for the tape cartridge, it may be applicable to ejection mechanisms for other media such as an optical disc, a magnetic disk, and so on. In addition, it may be applicable to other ejection systems such as a pop-up system of a kangaroo's pocket or the like, a tray system, and so on. Furthermore, although the damper holder is provided with the stopper in the above-mentioned embodiment, the stopper may be formed on the damper itself or the stopper may be formed on one of other existing movable parts. In addition, although the above-mentioned embodiment describes as regards an example where the ejection lever linearly (slidably) moves, this invention may be applicable to another example where the ejection lever rotates.

What is claimed is:

1. An ejection mechanism mounted on one side surface of a drive to eject, from said drive, a cartridge inserted in said drive, said ejection mechanism comprising:

an ejection lever extending in an insertion direction of said cartridge, said ejection lever being slidably mounted on said one side surface in an insertion/extraction direction of said cartridge, said ejection lever having an engaging portion for engaging with a front end surface of said cartridge when said cartridge is inserted in said drive;

urging means for urging said ejection lever in an ejection direction of said cartridge, said urging means extending in said insertion/extraction direction, said urging means having a first end connected to said one side surface and a second end connected to said ejection lever;

a damping member, mounted on said one side surface and engaged with said ejection lever, for braking movement of said ejection lever, said damping member having a stopper for stopping the movement of said ejection lever; and mounting position adjusting means for adjusting a mounting position of said damping member to said one side surface.

2. An ejection mechanism as claimed in claim 1, wherein said damping member comprises a damper for braking the movement of said ejection lever and a damper holder, mounted on said one side surface, for holding said damper, said damper holder having a mounting surface mounted and fixed on said one side surface and a damper holding surface which is perpendicularly bent from said mounting surface and which extends horizontally, said damper holding surface holding said damper thereon, said mounting position adjusting means comprising a pair of long holes which is formed in said mounting surface and which extends in said insertion/extraction direction with apart from each other, each of said long holes having a predetermined length and a pair of screws for fixing said mounting surface on said one side surface through said pair of long holes by screwing said mounting surface on said one side surface.

3. An ejection mechanism as claimed in claim 2, wherein said predetermined length is equal to about 15 mm.

4. An ejection mechanism as claimed in claim 1, wherein said urging means comprises an ejection spring having said first end connected to a protrusion portion protruding from said one side surface at a front side of said tape driver and said second end connected to a projection portion projecting from said ejection lever at a back side end of said ejection lever.

5. An ejection mechanism as claimed in claim 1, wherein said ejection lever comprises a rack which extends between a center thereof and a back side thereof, said damping member comprising a damper for braking the movement of said ejection lever and a damper holder, mounted on said one side surface, for holding said damper, said damper comprising a damper body fixed on said damper holder and a pinion, rotatably mounted on said damper body, for engaging with said rack.

6. An ejection mechanism as claimed in claim 5, wherein said stopper is formed on said damper holder.

* * * * *